United States Patent
Shiotani

(10) Patent No.: US 9,699,591 B2
(45) Date of Patent: Jul. 4, 2017

(54) WIRELESS COMMUNICATION SYSTEM, WIRELESS COMMUNICATION DEVICE, AND RECORDING MEDIUM STORING A WIRELESS COMMUNICATION PROGRAM

(71) Applicant: Yoshimitsu Shiotani, Kanagawa (JP)

(72) Inventor: Yoshimitsu Shiotani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 65 days.

(21) Appl. No.: 14/753,654

(22) Filed: Jun. 29, 2015

(65) Prior Publication Data

US 2016/0007351 A1 Jan. 7, 2016

(30) Foreign Application Priority Data

Jul. 1, 2014 (JP) .................................. 2014-135900

(51) Int. Cl.
| | |
|---|---|
| *H04W 4/00* | (2009.01) |
| *H04B 15/00* | (2006.01) |
| *H04W 76/02* | (2009.01) |
| *H04W 88/06* | (2009.01) |
| *H04W 40/02* | (2009.01) |
| *H04W 88/04* | (2009.01) |
| *H04W 84/20* | (2009.01) |

(52) U.S. Cl.
CPC ............ *H04W 4/005* (2013.01); *H04B 15/00* (2013.01); *H04W 40/02* (2013.01); *H04W 76/023* (2013.01); *H04W 84/20* (2013.01); *H04W 88/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2003/0037033 A1* | 2/2003 | Nyman | H04L 29/12264 |
| 2014/0071850 A1* | 3/2014 | Abraham | H04W 76/021 370/254 |

(Continued)

FOREIGN PATENT DOCUMENTS

| | | |
|---|---|---|
| JP | 2004-364287 | 12/2004 |
| JP | 2008-514140 | 5/2008 |

(Continued)

*Primary Examiner* — Eunsook Choi
(74) *Attorney, Agent, or Firm* — Cooper & Dunham LLP

(57) ABSTRACT

A wireless communication system includes multiple wireless communication devices including a first wireless communication device that centrally controls a plurality of second wireless communication devices and compatible with a multiple wireless communication standards. The multiple wireless communication standards includes a first wireless communication standard and one or more wireless communication standards using a frequency band lower than that of the first wireless communication standard. The first wireless communication device includes a receiver, a determination unit, and a transmitter. The plurality of second wireless communication devices each establish the wireless communication using the first wireless communication standard based on the routing information that each of the plurality of second wireless communication devices itself acquires from the first wireless communication device.

14 Claims, 6 Drawing Sheets

(56) References Cited

U.S. PATENT DOCUMENTS

| | | | |
|---|---|---|---|
| 2014/0254349 A1* | 9/2014 | Jia | H04W 28/04 370/225 |
| 2016/0006837 A1* | 1/2016 | Reynolds | H04W 84/18 709/203 |
| 2016/0057662 A1* | 2/2016 | Persson | H04W 8/24 455/436 |
| 2016/0198350 A1* | 7/2016 | Lou | H04W 72/0453 370/252 |
| 2016/0277170 A1* | 9/2016 | Jia | H04W 28/04 |

FOREIGN PATENT DOCUMENTS

| | | |
|---|---|---|
| JP | 2010-213279 | 9/2010 |
| JP | 2012-065116 | 3/2012 |
| JP | 2012-089966 | 5/2012 |
| JP | 2013-505666 | 2/2013 |
| WO | WO2006/039189 A1 | 4/2006 |
| WO | WO2011/037713 A2 | 3/2011 |

* cited by examiner

FIG. 6
| PBSS | PCP | SERVICE PERIOD SCHEDULING DATA |
|---|---|---|
| PBSS (A, B) | A | ... |
| PBSS (B, C) | B | ... |
| ⋮ | ⋮ | ⋮ |
FIG. 7A
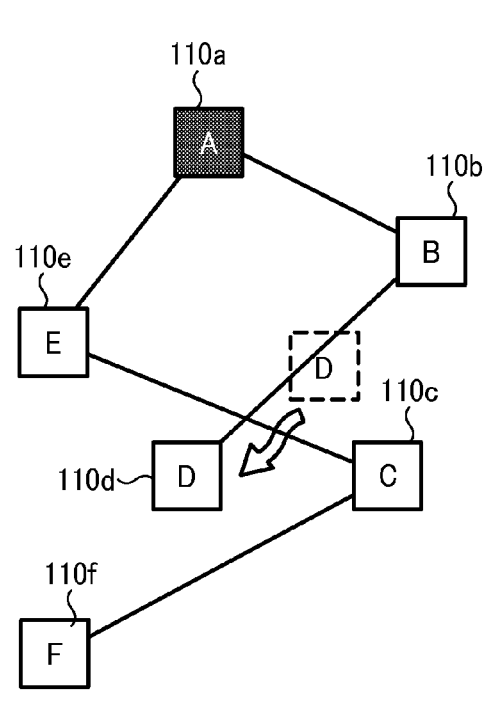
FIG. 7B
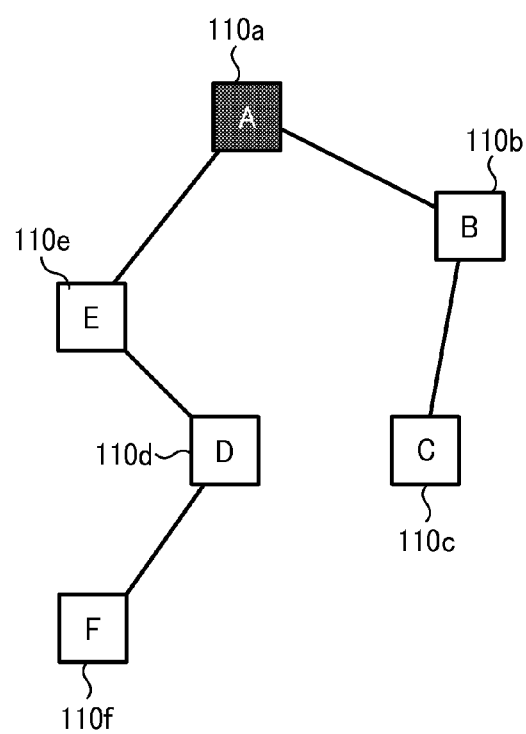

WIRELESS COMMUNICATION SYSTEM, WIRELESS COMMUNICATION DEVICE, AND RECORDING MEDIUM STORING A WIRELESS COMMUNICATION PROGRAM

CROSS-REFERENCE TO RELATED APPLICATION

This patent application is based on and claims priority pursuant to 35 U.S.C. §119(a) to Japanese Patent Application No. 2014-135900, filed on Jul. 1, 2014 in the Japan Patent Office, the entire disclosure of which is hereby incorporated by reference herein.

BACKGROUND

Technical Field

The present invention relates to a wireless communication system, a wireless communication device, and a non-transitory recording medium storing a communication program.

Background Art

Recently, wired networks have been replaced with wireless networks. Especially, with widespread use of devices with wireless communication capability such as tablet devices and smartphone devices, it is predicted that wireless networks will become more popular in the future. In addition, application of the wireless communication has expanded from information processing devices such as personal computers, tablets, and smartphones to various other communication devices such as health care devices, smart grid devices, in-vehicle communication devices, vehicle-to-vehicle communication devices, and Machine-to-Machine (M2M) communication devices, and various wireless communication specifications compatible with those applications have been proposed.

SUMMARY

An example embodiment of the present invention provides a novel wireless communication system that includes multiple wireless communication devices including a first wireless communication device that centrally controls a plurality of second wireless communication devices and compatible with a multiple wireless communication standards. The multiple wireless communication standards includes a first wireless communication standard and one or more wireless communication standards using a frequency band lower than that of the first wireless communication standard. The first wireless communication device includes a receiver that receives device specific information from each one of the plurality of second wireless communication devices using at least one of the multiple wireless communication standards, a determination unit that determines a communication pathway constructing a network compatible with the first wireless communication standard, based on the device specific information of each one of the plurality of second wireless communication devices, and a transmitter that transmits routing information that indicates the communication pathway for the control wireless communication device to each one of the plurality of second wireless communication devices using at least one of the multiple wireless communication standards. The plurality of second wireless communication devices each establish the wireless communication using the first wireless communication standard based on the routing information that each of the plurality of second wireless communication devices itself acquires from the first wireless communication device.

Further example embodiments of the present invention provide a wireless communication device and a non-transitory recording medium storing a wireless communication program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 6 is a diagram illustrating a data structure of routing information indicating a communication pathway determined by a routing determination unit in the wireless communication system as an embodiment of the present invention.

FIGS. 7A and 7B are diagrams illustrating reconfiguration of the mesh network in case of changing a position of a wireless communication device in a same BSS as an embodiment of the present invention.

DETAILED DESCRIPTION

Figure 1:
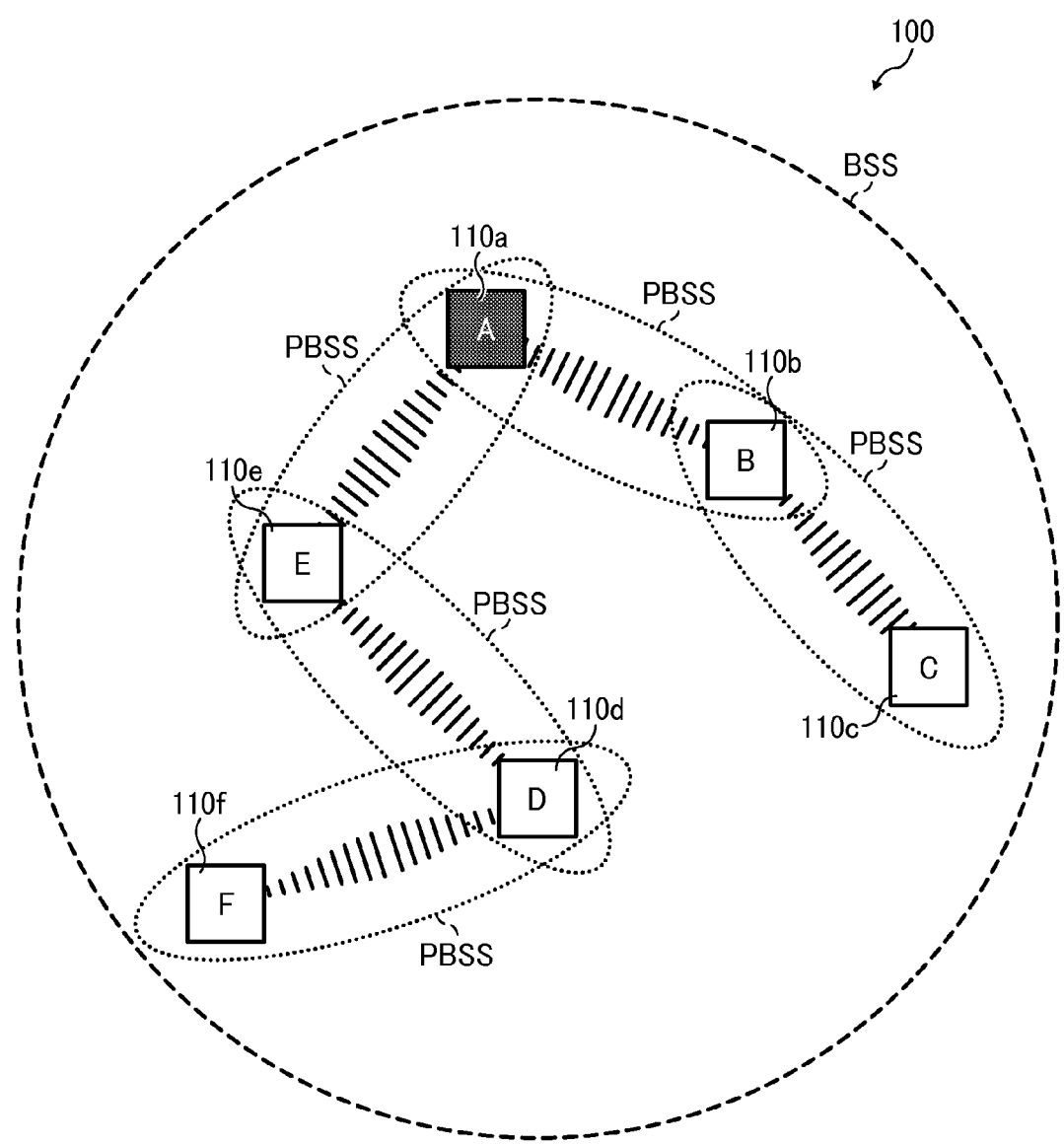
FIG. 1 is a diagram illustrating a mesh network constructed in a wireless communication system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In figures, same symbols are assigned to same or corresponding parts, and their descriptions are simplified or omitted appropriately.

FIG. 1 is a diagram illustrating a mesh network constructed in a wireless communication system 100 in this embodiment. The wireless communication system 100 in FIG. 1 includes multiple wireless communication devices 110 connected wirelessly in a mesh topology.

Each wireless communication device 110 in this embodiment includes a wireless communication function compatible with at least the EHF wireless communication standard. Each of the multiple wireless communication devices 110 is connected with a communication pathway using the EHF wireless communication standard to construct the wireless communication network. The communication pathways using the EHF wireless communication standard between the wireless communication devices 110 are shown as Personal Basic Service Sets (PBSS) drawn by dashed lines in FIG. 1.

Here, the EHF wireless communication is wireless communication using radio wave whose frequency is EHF frequency band (30 to 300 GHz), and a wireless communication standard referred to as Wireless Gigabit (WiGig) is known as an example of the EHF wireless communication. In the EHF wireless communication using 60 GHz frequency band, it is considered that high-speed communication as high as about 7 Gbps is capable theoretically, it is possible to transfer high-definition (HD) videos and large-sized files without compression, and it is possible to communicate wirelessly in real time without communication delays. However, due to the characteristics of EHF, the communication range is limited to about 10 meters, and it is not so suitable for all-directional wireless communication due to the strong directivity of the antenna. In addition, since the EHF wireless communication is high straight-ahead, it is possible to interrupt the communication if a masking goes between the devices.

A technology that constructs an autonomous distributed mesh network can be considered as a solution for at least a part of the issues of the EHF wireless communication described above. However, in the EHF wireless communication standards such as WiGig described above, since the TDMA protocol is adopted, it gets complicated to calculate a cost table such as time allocation for the most suitable routing control. In case of mobile information devices, the complicated control logic of wireless communication devices is not preferable from viewpoint of power consumption and circuit scale. In addition, the communication counterpart can be limited due to the directivity of the antenna, and it is possible that the appropriate hop destination is selected. Furthermore, it is possible that the network configuration and the communication pathways may not be modified flexibly.

To cope with the issues described above, in the wireless communication system 100 in this embodiment, one of the multiple wireless communication devices that construct the mesh network operates as a central control station. In addition, the wireless communication device that works as the central control station collects information from other wireless communication devices to control communication pathways of EHF wireless communication among multiple wireless communication devices (including the wireless communication device that works as the central control station itself) dynamically.

The central control station collects device information specific to each wireless communication device (device specific information) to determine a network configuration and routing control, and the central control station determines the network topology and the most suitable communication pathways between devices based on the collected device specific information. The central control station transfers routing information that indicates the communication pathway to each of other wireless communication devices. After receiving the routing information, each of the wireless communication devices determines a counterpart wireless communication device to perform the EHF wireless communication. As a result, in view of the problem of limitation of the communication distance for the EHF wireless communication, the central control station, which centrally manages, can modify the network configuration dynamically. Consequently, it is possible to maintain the most suitable communication pathways and high communication quality.

In this embodiment, the wireless communication devices 110 are compatible with a dual-band or tri-band method. The device specific information is collected and the routing information is transferred by performing wireless communication using the multi-band function that the wireless communication device 110 includes.

For example, the wireless communication device 110 can perform wireless communication using the EHF wireless communication standard in 60 GHz band and wireless communication standards using any one of 2.4 GHz band and 5 GHz band. It is predicted that the number of devices compatible with the dual-band (60 GHz and 2.4/5 GHz) and tri-band (60 GHz, 2.4 GHz, and 5 GHz) are increasing in the future due to wide spread use of the EHF wireless communication compared to wireless LAN in 2.4 GHz band and 5 GHz band that are mostly used now. In addition, each wireless communication devices 110 includes a positioning function to acquire their own position data as the device specific information. The positioning information described above is acquired by a GPS function that most devices now have.

Among the wireless communication devices 110a to 110f in FIG. 1, the wireless communication device 110a indicated by a solid black square works as the central control station. In this embodiment, a mesh network using the EHF wireless communication standard includes the wireless communication device 110a as the central control station and the wireless communication devices 110b to 110f as other stations (STAs).

In the preferred embodiment, the device with high processing performance and plenty of resources is selected as the wireless communication device 110a as the central control station. However, it is not limited to that case. In this embodiment, the central control station is preselected. Devices with limited resources such as the mobile information devices can be used as the wireless communication devices 110b to 110f. However, they are not limited to that case. Any device such as generic computers, e.g., personal computers, workstations, and blade servers, mobile information devices, e.g., smartphones and tablet computers, dedicated devices, e.g., access points can be used as the wireless communication device 110.

In the below description, IEEE 802.11ad (WiGig) is used as the wireless communication standard in 60 GHz band, and IEEE 802.11a (5 GHz), IEEE 802.11b (2.4 GHz), IEEE 802.11g (2.4 GHz), IEEE 802.11n (2.4 GHz and 5 GHz), and IEEE 802.11ac (5 GHz) are used as wireless communication standards in 2.4 GHz band and 5 GHz band.

The network establishing function in this embodiment can be used in establishing a network using the wireless communication standard that uses electromagnetic wave at high frequency with large transmission loss, high directivity and high straightness, i.e., the EHF wireless communication as carrier preferably. However, the wireless communication standards are not limited to the combination described above. The combination of any proposed wireless communication standards or wireless communication standards to be proposed in the future can be used. It is possible to apply the network establishing function in this embodiment to any combination of multiple wireless communication standards that use electromagnetic wave in multiple frequency bands as carriers.

In FIG. 1, communication ranges of the wireless communication standards using a frequency band lower than the EHF wireless communication are shown as Basic Service Set (BSS) indicated by dashed ellipses. In FIG. 1, the central control station 110a and other wireless communication devices 110b to 110f are within the BSS of the wireless communication standards (11a/b/g/n/ac) that use frequency bands lower than the EHF wireless communication standard, and each of them can communicate with each other. In the preferred embodiment, the access point of the wireless communication standard (11a/b/g/n/ac) is selected as the central control station. In addition, in this embodiment, it is considered that all wireless communication devices 110a to 110f are located within one BSS. However, the configuration is not limited to that. It is possible to locate the wireless communication device within an Extended Service Set (ESS) established over multiple wireless LAN access points.

Figure 2:
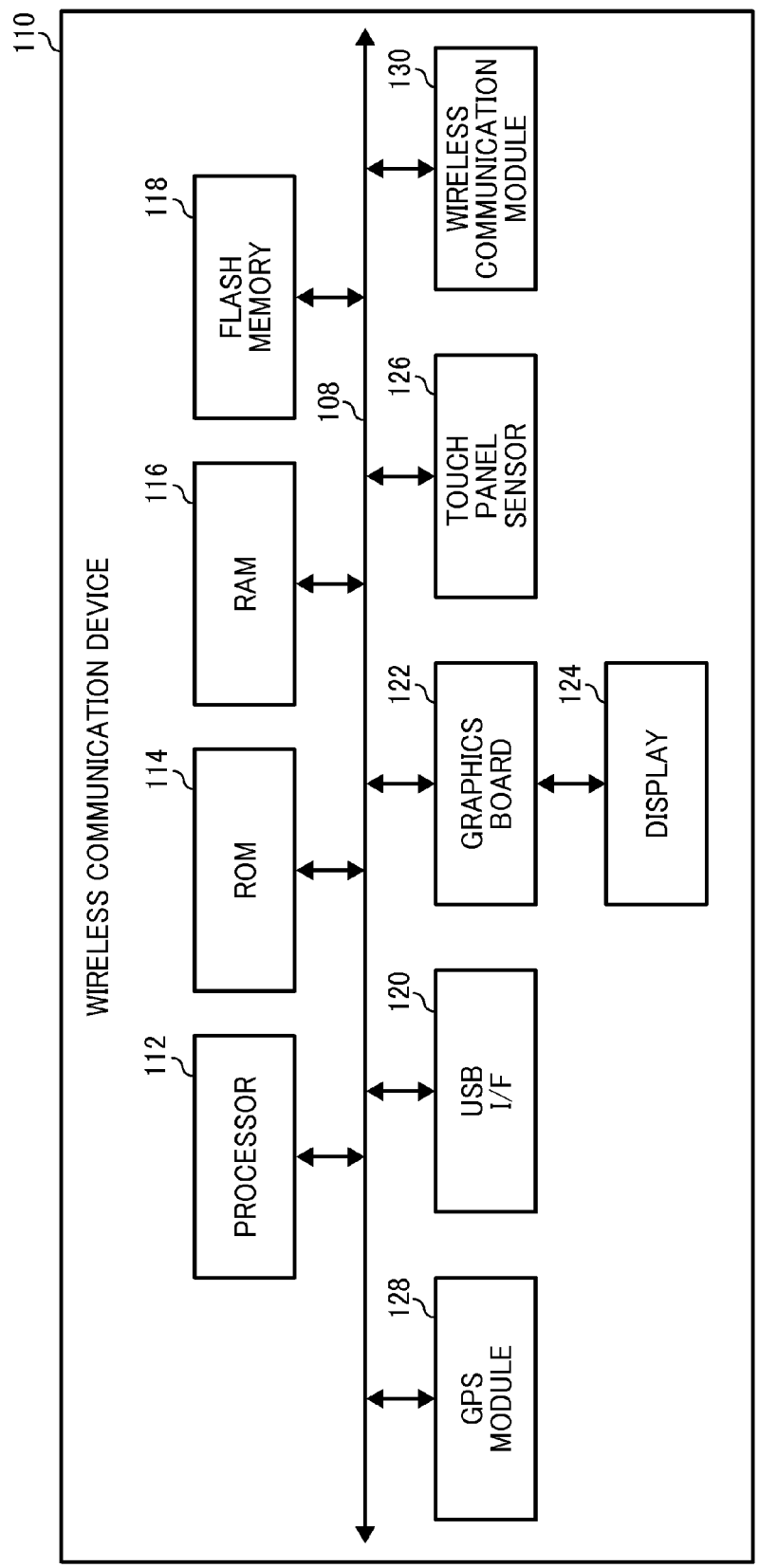
FIG. 2 is a block diagram illustrating a hardware configuration of a wireless communication device that constructs the wireless communication system as an embodiment of the present invention.

A hardware configuration of the wireless communication device 110 that constructs the wireless communication system 100 in this embodiment is described below with reference to FIG. 2. FIG. 2 is a block diagram illustrating a hardware configuration of the wireless communication device 110 that constructs the wireless communication system 100 in this embodiment.

The wireless communication device 110 in FIG. 2 includes a processor 112, a Read Only Memory (ROM) 114, a Random Access Memory (RAM) 116, a flash memory 118, a USB interface 120, a graphics board 122, a display 124, a touch panel sensor 126, a Global Positioning System (GPS) module 128, and a wireless communication module 130.

The processor 112 controls processes performed by the wireless communication device 110, and various processors such as a Central Processing Unit (CPU) and Micro Processing Unit (MPU), e.g., Pentium, can be used as the processor 112. The ROM 114 is a nonvolatile memory that stores a boot program etc. such as a Basic Input/Output System (BIOS) etc.

The RAM 116 is a volatile memory or a nonvolatile memory that provides an work area for the processor 112 in executing programs. The processor 112 can expand and execute programs written in program languages such as assembler, C, C++, Java, Javascript, Perl, Ruby, and Python etc. under control of an Operating System (OS).

The flash memory 118 is a large-sized nonvolatile memory, and the flash memory stores a predetermined OS such as Windows series, UNIX, LINUX, Android, and iOS etc. that controls entire wireless communication device 110. In addition, the flash memory stores various data such as device drivers for the graphics board 122, the display 124, and the touch panel sensor 126 and main processing programs etc.

The USB interface 120 connects the wireless communication device 110 to an external apparatus via a USB connector provided on an outer surface of a case of the wireless communication device 110. The graphics board 122 processes drawing data displayed on the display 124, and the graphics board 122 includes a Video RAM (VRAM) that stores image data and a video connecting terminal of the display 124. The display 124 displays the drawing data generated by the graphics board 122. The touch panel sensor 126 detects that an object such as a pen or a finger, as the object touches or approaches the display screen.

The GPS module 128 is compatible with an indoor GPS such as Indoor MEssaging System (IMES) and an indoor positioning system that uses a pulse-method Ultra Wide Band (UWB) etc. In case of constructing the mesh network using the EHF wireless communication, it is most likely that the wireless communication devices are provided at high density, such that it is preferable to use a technology that can measure positions at high precision. However, the GPS module 128 is not limited to the one described above. It is possible to use positioning by an outdoor GPS, optical communication, and infrared and positioning by access points using beacon frames of the wireless LAN.

The wireless communication module 130 connects the wireless communication device 110 to external wireless communication devices wirelessly. In this embodiment, the wireless communication module 130 includes a chip compatible with dual-band and tri-band and an antenna module. The antenna module for the EHF wireless communication includes an active antenna such as a phased-array antenna, and the antenna module is configurable from a nondirectional antenna or semi-nondirectional antenna to a narrow directional antenna.

Figure 3:
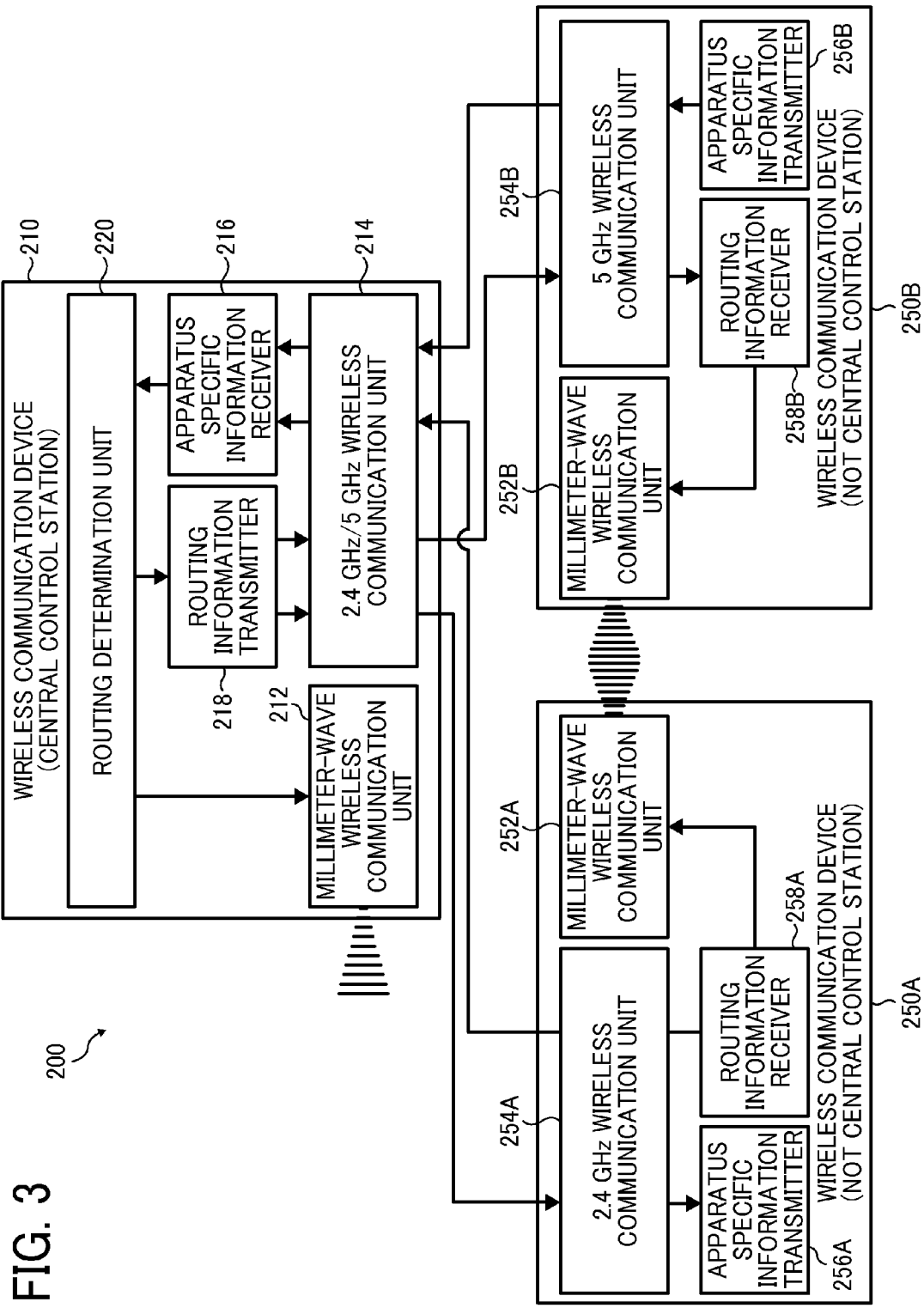
FIG. 3 is a block diagram illustrating functions of the wireless communication system as an embodiment of the present invention.

A functional configuration of the wireless communication system 100 in this embodiment is described below with reference to FIG. 3. FIG. 3 is a block diagram illustrating functions of the wireless communication system 100 in this embodiment. A functional block 200 of the wireless communication system 100 in FIG. 3 includes a functional block 210 implemented on the wireless communication device as the central control station and functional blocks 250A and 250B implemented on the wireless communication devices other than the central control station. In the description below, the wireless communication device as the central control station can be referred to as the central control station 210, and the wireless communication devices other than the central control station can be referred to as the other wireless communication devices 250.

A functional configuration of the central control station 210 is described below with reference to FIG. 3. The functional block 210 of the central control station in FIG. 3 includes an EHF wireless communication unit 212, a 2.4 GHz/5 GHz wireless communication unit 214, a device specific information receiver 216, a routing information transmitter 218, and a routing determination unit 220.

The EHF wireless communication unit 212 is a functional unit implementing a wireless communication function of IEEE 802.11ad (WiGig) using the EHF wireless communication standard described above. The 2.4 GHz/5 GHz wireless communication unit is a functional unit implementing a wireless communication function by the EHF wireless communication standards, i.e., IEEE 802.11a (5 GHz), IEEE 802.11b (2.4 GHz), IEEE 802.11g (2.4 GHz), IEEE 802.11n (2.4 GHz and 5 GHz), and IEEE 802.11ac (5 GHz), using wireless frequency bands in 2.4 GHz and 5 GHz described above. In this embodiment, the central control station 210 is compatible with the wireless communication standards in both 2.4 GHz and 5 GHz.

The device specific information receiver 216 receives the device specific information from each of the other wireless communication devices 250 using at least any one of the multiple wireless communication standards described above Especially, if the EHF wireless communication network has not been constructed yet, the device specific information gets collected by wireless communication using wireless frequency bands in at least any one of 2.4 GHz and 5 GHz that covers wide areas. However, in the dynamic reconfiguration after the EHF wireless communication network is once constructed, it is possible to collect all of or a part of the information using the EHF communication.

Here, the device specific information includes position data positioned by the GPS function. Furthermore, the device specific information can include antenna data such as characteristic information of antenna and directivity information of antenna used for the wireless communication using the EHF wireless communication standard. While the antenna data is not limited specifically, examples of the antenna data are information on directivity of the antenna and information on communicable antennas.

The routing determination unit 220 determines the communication pathways that construct the mesh network using the EHF wireless communication standard based on the device specific information of the central control station 210 itself and the collected device specific information of each of the other wireless communication devices 250. The device specific information includes the position data. Preferably, the routing determination unit 220 can determine the communication pathways to reduce intervention among communication pathways based on the position data included in the collected device specific information. In addition, since the most suitable topology and the most suitable network configuration can be different depending on application of the wireless communication network, it is possible to determine the communication pathways based on the use of the wireless communication network.

The routing information transmitter 218 transfers the routing information that indicates the communication pathway for each of the determined wireless communication devices 250 to each of the other wireless communication devices 250 using at least any one of the multiple wireless communication standards described above. The routing information can include identification information that identifies the counterpart (source or destination) wireless communication device using the EHF wireless communication standard and reserved time information used when the wireless communication device that receives the routing information transfers data to the counterpart wireless communication device using the EHF wireless communication standard. Preferably, the routing information transmitter 218 can transfer the routing information using the wireless communication in 2.4 GHz or 5 GHz lower than the EHF. However, in the dynamic reconfiguration after the EHF wireless communication network is once constructed, it is possible to transfer all of or a part of the routing information using the EHF communication.

A functional configuration of the wireless communication devices 250 other than the central control station is described below with reference to FIG. 3. A functional block 250 in FIG. 3 includes an EHF wireless communication unit 252, a wireless communication unit 254, a device specific information transmitter 256, and a routing information receiver 258.

The EHF wireless communication unit 252 is a functional unit implementing a wireless communication function of IEEE 802.11ad (WiGig) using the EHF wireless communication standard described above. The wireless communication unit 254 is a functional unit implementing a wireless communication function by the EHF wireless communication standards, i.e., IEEE 802.11a/b/g/n/ac using wireless frequency bands in 2.4 GHz or 5 GHz described above. In FIG. 3, the wireless communication device 250A includes the 2.4 GHz wireless communication unit 254A, and the other wireless communication device 250B includes the 5 GHz wireless communication unit 254B. That is, in this embodiment, the wireless communication device 250A is compatible with the wireless communication standard in 2.4 GHz frequency band only, and the wireless communication device 250B is compatible with the wireless communication standard in 5 GHz frequency band only. The network establishing function in this embodiment can be the environment mixed with multiple wireless communication standards described above.

The device specific information transmitter 256 transfers its own device specific information to the central control station 210 using the wireless communication unit 254 in response to a request from the central control station 210 or regardless of the request regularly or irregularly. The routing information receiver 258 receives the routing information distributed by the central control station 210 using the wireless communication unit 254.

The EHF wireless communication unit 252 establishes the wireless communication with the other wireless communication device using the EHF wireless communication standard based on the routing information that the EHF wireless communication unit 252 acquires itself. After configuring the antenna semi-directive or non-directive once, the EHF wireless communication unit 252 searches for the wireless communication device indicated as the counterpart in the routing information, and it is possible to change the configuration into the directive antenna with the found counterpart using a beam-forming function. Otherwise, in case of less intervention, the EHF wireless communication unit 252 can perform the wireless communication using the EHF wireless communication standard with the counterpart wireless communication device without using the beam-forming function.

Figure 4:
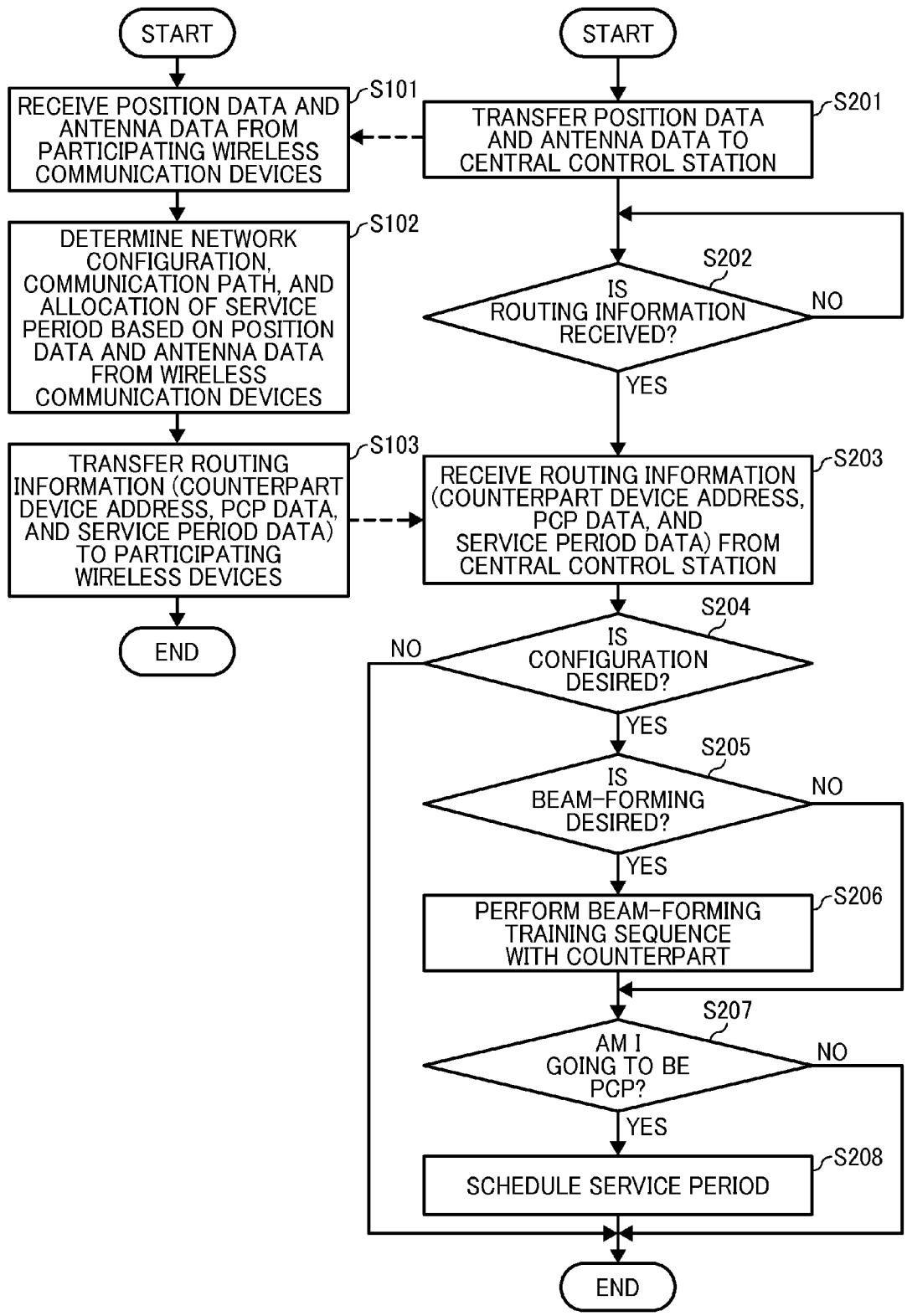
FIG. 4 is a flowchart illustrating a process of constructing a network executed in the wireless communication system as an embodiment of the present invention.

A network constructing process performed by the wireless communication system 100 in this embodiment is described below in detail with reference to FIG. 4. FIG. 4 is a flowchart illustrating a process of constructing a network executed in the wireless communication system 100 in this embodiment. Steps S101 to S104 on the left side of FIG. 4 are performed by the central control station 210. By contrast, steps S201 to S209 on the right side of FIG. 4 are performed by the wireless communication device 250 other than the central control station.

Each of the central control station 210 and the other wireless communication device 250 starts the process in FIG. 4. In S201, the wireless communication device 250 transfers the device specific information including the position data and the antenna data to the central control station 210, and the process proceeds to S202. In S202, the wireless communication device 250 waits for distributing the routing information by the central control station 210, and the process loops at S202 until the routing information is received (NO in S202). In this embodiment, the wireless communication device 250 transfers the device specific information spontaneously. However, it is possible that the wireless communication device 250 transfers the device specific information in response to the request by the central control station 210.

On the other hand, in S101, in response to the execution by the other wireless communication device 250 in S201, the central control station 210 receives the device specific information including the position data and the antenna data from each of the other wireless communication devices 250 participating in the network. For example, the central control station 210 can collect information by polling each of the other wireless communication devices 250. Otherwise, it is possible to reserve communication time between each of the wireless communication devices 250 preliminarily and collect information from each of the wireless communication devices 250 at the reserved time. The specific way of collecting information is not limited to a particular method.

In S102, in the central control station 210, the routing determination unit 220 determines the network configuration, the communication pathways, and allocation for service period (SP) based on the position data and the antenna data of the central control station 210 itself and the other wireless communication devices 250. In this case, the communication pathways are determined so that the communication pathways between the wireless communication devices 110 do not overlap, and the wireless communication device to be a PBS Central Point (PCP) is determined in each PBSS.

Figure 5A:
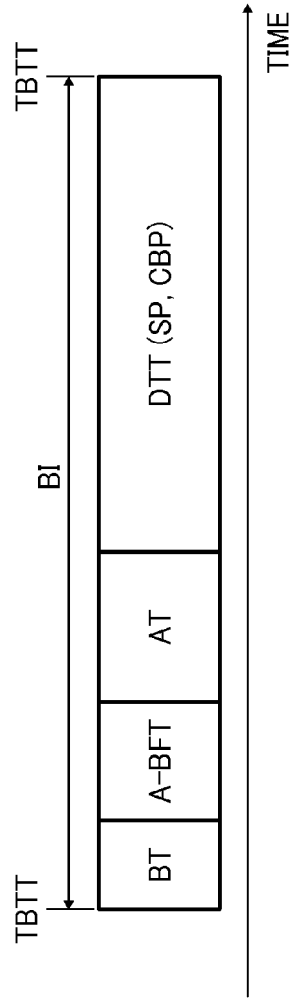
FIG. 5A is a diagram illustrating allocation of extremely high frequency (EHF) wireless communication time.

FIG. 5A is a diagram illustrating allocation of the EHF wireless communication time at Beacon Interval (BI) in the PBSS defined by WiGig. The BI includes Beacon Time (BT), Association Beam-Forming Training period (A-BFT), announcement time, and Data Transfer Time (DTT). A Service Period (SP) and Contention Based Period (CBP) are scheduled within the DTT.

The wireless communication device to be the PCP transfers a beacon frame to the wireless communication devices as members in the PBSS within the BT. The PBSS is a basic service set provided since a normal infrastructure Basic Service Set (BSS) and an Independent Basic Service Set (IBSS) do not function favorably using the EHF wireless communication in GHz. Just like the IBSS, the PBSS is an ad hoc network that the stations can communication with each other directly without dedicated devices such as access points etc. On the other hand, unlike the IBSS, it is desired that one station play a role of the PCP in the PBSS. The PCP provides standard timing for the PBSS and allocates the SP and the CBP.

The beacon frames are transferred periodically at the period of the BI. Within the BI, a training sequence of beam forming between the wireless communication device to be the PCP and the other wireless communication devices other than the PCP in the PBSS is performed in the A-BFT period. The A-BFT period is mainly used by mobile wireless communication devices or is mainly used if the wireless communication device that participates in the PBSS newly. In announcement time (AT), the device to be the PCP distributes scheduling information on the SP and the CBP within the subsequent DTT to each device in the PBSS. The beacon frames transferred in the BT indicate whether or not the A-BFT period and the AT are included in the BI. The SP and the CBP in the DTT are scheduled by the PCP. The SP is communication time that bandwidth is guaranteed. On the other hand, the CBP is a channel access period in accordance with the Carrier Sense Multiple Access/Collision Avoidance (CSMA/CA) protocol. The PCP in each PBSS modifies channel reservation information dynamically for each BI and notifies each device about that using the beacon frames or the AT frames.

Figure 5B:
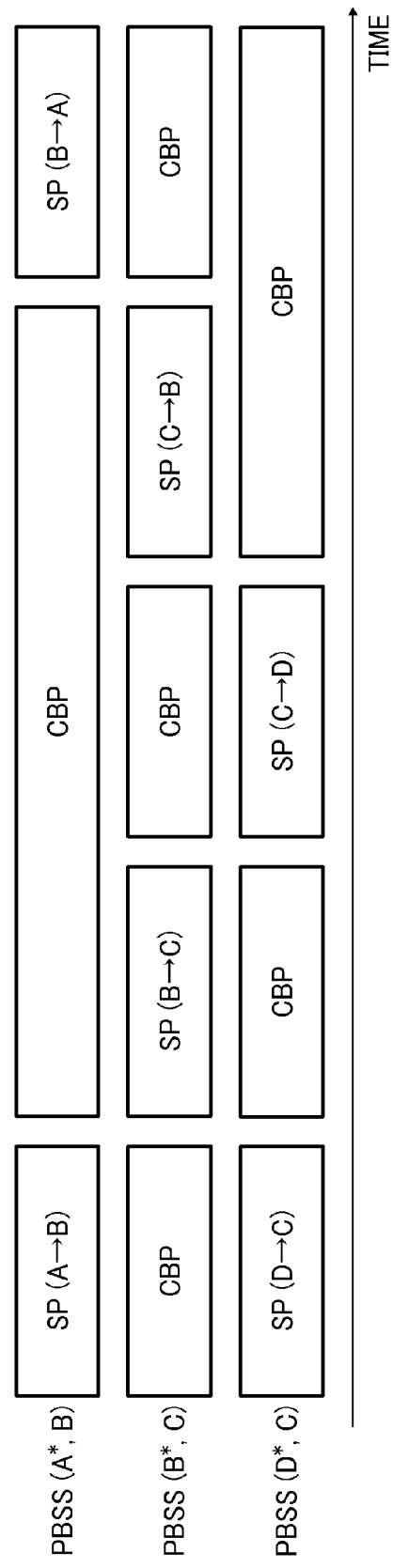
FIG. 5B is a diagram illustrating scheduling of communication time.

FIG. 5B is a diagram illustrating scheduling of communication time that the PCP performs in the mesh network in this embodiment. As long as the wireless communication devices 110 in the mesh network are not the source or the final destination, the wireless communication devices 110 transfer the received data as the repeater. In case of being the final destination or the repeater and receiving data, the wireless communication device 110 becomes the station other than the PCP in accordance with scheduling by the PCP in the PBSS. By contrast, in case of being the final destination or the repeater and transferring data, the wireless communication devices 110 becomes the PCP itself and schedule the data transfer time.

It is configured that only one PCP station and one non-PCP station belong to one PBSS, and the PCP performs adjustment so that the SP reserved in each PBSS does not overlap and the SP is reserved in the order of hopping.

FIG. 6 is a diagram illustrating a data structure of the routing information indicating the communication pathway determined by the routing determination unit 220 in the wireless communication system 100 in this embodiment. As shown in FIG. 6, the routing determination unit 220 configures the device to be the PCP and scheduling information during the SP for each PBSS that constructs the mesh network.

Back to FIG. 4, in S103, the central control station 210 transfers the determined routing information (counterpart device address, PCP information (information on becoming the PCP in case of communicating with which wireless communication device), and SP information (information of controlling time scheduled for the SP in each PBSS in case of being the PCP)) to each of other participating wireless communication devices 250. The wireless communication in 2.4 GHz band or 5 GHz band can be used for the information distribution. In the information distribution, it is possible that the routing information is stored in the beacon frame. Otherwise, it is possible to notify the wireless communication devices sequentially about the routing information described above using unicast communication. After distributing the routing information to each of the wireless communication devices 250, the process performed by the central control station 210 ends.

On the other hand, if the routing information transferred in S103 arrives at the wireless communication device 250, it is determined that the routing information has been received in S202. If it is determined that the routing information has been received (YES in S202), the process proceeds to S203. In S203, the other wireless communication devices 250 receive the routing information (the counterpart device address, PCP information, and SP information) from the central control station 210. In S204, the wireless communication device determines whether or not the configuration is desired. For example, it is determined that the configuration is desired in the first flow. If it is determined that the configuration is desired (YES in S204), the process proceeds to S205.

In S205, the other wireless communication device 250 determines whether or not the beam forming is desired. It is determined that the beam forming is desired if the counterpart device is not registered in the other wireless communication device 250 itself. If it is determined that the beam forming is desired (YES in S205), the process proceeds to S206.

In S206, the wireless communication device 250 searches for the counterpart device and performs a training sequence of the beam forming in the EHF wireless communication with the counterpart wireless communication device. It is possible to perform the training during the A-BFT period when the PCP performs the scheduling or at another timing. In addition, to search for the counterpart, it is possible that the device to be the PCP transfers the beacon frame and the device not to be the PCP scans the beacon frame. Otherwise, it is possible that the central control station 210 performs listening when the central control station collects the device specific information and distributes the routing information described above. In case of scanning the beacon frame using the antenna for the EHF wireless communication, after configuring the antenna semi-directive or non-directive once, the EHF wireless communication unit 252 can search for the wireless communication device indicated as the counterpart in the routing information, and it is possible to change the configuration into the most appropriate directive antenna with the found counterpart using a beam-forming function. In the above description, the EHF wireless communication is performed using the beam forming function. However, it is possible to perform communication without the beam forming function with less influence of interference etc.

If it is determined that the beam forming is not desired (NO in S205), the process proceeds to S207 directly. In S207, the process branches depending on whether or not the wireless communication device itself becomes the PCP. If the wireless communication device itself becomes the PCP (YES in S207), in S208, the wireless communication device 250 performs scheduling within the SP based on the SP information regarding the communication with the counterpart indicated by the counterpart device address. In addition, the DTT period that is not scheduled as the SP is scheduled as the CBP. In addition, the A-BFT period and the AT are allocated. By contrast, if the wireless communication device itself does not become the PCP (NO in S207), the process proceeds to S209 directly. In this case, the SP and the CBP in the communication pathway are scheduled depending on the counterpart PCP.

That is, in the wireless communication with the counterpart wireless communication device indicated as the destination in the routing information using the EHF wireless communication standard, each of the other wireless communication device 250 itself becomes the PCP and performs scheduling. By contrast, in the wireless communication with the counterpart wireless communication device indicated as the source in the routing information, the counterpart wireless communication device becomes the PCP. Accordingly, the PCP adjusts the SP of the wireless communication based on the SP information (reservation time information) indicated in the routing information.

Accordingly, the process performed by the wireless communication device 250 other than the central control station 210 ends. If it is determined that the configuration is not desired (NO in S204), the process ends. For example, in the second flow and later, if the communication pathway is not modified substantially from the communication pathway determined last time, it is possible to finish the process as is and prepare for another occasion. The process flow in FIG. 4 is performed regularly or irregularly, and if the modification is detected based on the device specific information of each of the wireless communication devices, the mesh network is reconfigured.

In the above description, there are the central control station 210 and the wireless communication devices 250 other than the central control station. In this case, the central control station itself also participates in the wireless communication network using the EHF wireless communication standard in the same box as the other wireless communication devices. As a result, after determining the communication pathway, the central control station can establish its own communication pathway appropriately based on the routing information determined for the central control station 210 itself.

After the central control station 210 and all of the other wireless communication devices 250 performs the process described above, it is possible to start data communication in the mesh network. In this case, each wireless communication device 250 can report to the central control station 210 that it finishes preparing for the data communication. In addition, in the preferable embodiment, once the mesh network using EHF wireless communication is established, the central control station 210 requests a list of currently communicable counterparts using the EHF wireless communication standard to collect a list of device addresses of communicable counterparts from each of the wireless communication devices 250. Subsequently, based on the list of the currently communicable counterparts transferred by each of the wireless communication devices 250 in the network using the EHF wireless communication standard, the routing determination unit 220 in the central control station 210 can determine the routing control in the mesh network and the network topology.

The network constructing function described above in this embodiment can be preferably adopted to a case that the mesh network is established using the EHF wireless communication in an area where the wireless communication devices 110 are packed to a certain degree of density. For example, recently, cases that students and teachers conduct classes using tablet devices in schools and preparatory schools are becoming popular. In these cases, for example, the network constructing function in this embodiment can be preferably adopted in case of displaying a screen displayed on a student's tablet device on an electronic whiteboard and displaying screen information displayed on a teacher's tablet device or the electronic whiteboard on all students' devices.

In the cases described above, it is possible that each of the wireless communication devices 110 changes its position frequently. In these cases, the central control station 210 in this embodiment can acquire the position data of the wireless communication devices 259 at a certain frequency and modify the communication pathways of the mesh network and the network configuration dynamically based on the collected information.

FIGS. 7A and 7B are diagram illustrating reconfiguration of the mesh network in case of changing the position of the wireless communication device 110 in the same BSS in this embodiment. In case the wireless communication device 110d changes its position in FIG. 7A, if the PBSS that each wireless communication device 110 belongs is not modified (i.e., the counterpart devices are not changed), the communication pathways of the PBSS overlap as shown in FIG. 7A and the data communication can be interfered depending on scheduling by each PCP. By contrast, in this embodiment, the central control station 210 detects that the position data of the wireless communication device 250 has been changed, reconfigure the communication pathways and network configuration to avoid the interference if the communication pathways overlap, and distributes the routing information to each of the wireless communication devices. Consequently, as shown in FIG. 7B, it is possible to reconfigure the most appropriate mesh network. In addition, it is possible to maintain the most suitable communication pathways and high communication quality.

As described in the embodiments above, in the wireless communication system that includes multiple wireless communication apparatuses compatible with wireless communication standards in multiple frequency bands, it is possible that the central control station among the multiple wireless communication devices collects information from the other wireless communication devices to configure the wireless communication network dynamically using a first wireless communication standard.

The present invention also encompasses a wireless communication method. The method includes the steps of including a first wireless communication standard and one or more wireless communication standards using a frequency band lower than the first wireless communication standard, receiving device specific information from one of the plurality of wireless communication devices using at least one of the multiple wireless communication standards, the multiple wireless communication standards including a first wireless communication standard and one or more wireless communication standards using a frequency band lower than that of the first wireless communication standard, determining a communication pathway constructing a network compatible with the first wireless communication standard, based on the device specific information of the one of the plurality of wireless communication devices, and transmitting routing information that indicates the communication pathway for the wireless communication device to the one of the plurality of wireless communication devices using at least one of the multiple wireless communication standards.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. A part of the functions of the described embodiments or all functions of the described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A wireless communication system, comprising multiple wireless communication devices including:
    a first wireless communication device that centrally controls a plurality of second wireless communication devices and compatible with multiple wireless communication standards, the multiple wireless communication standards including a first wireless communication standard and one or more wireless communication standards using a frequency band lower than that of the first wireless communication standard, the first wireless communication device including:
    a receiver to receive device specific information from each one of the plurality of second wireless communication devices using at least one of the multiple wireless communication standards;
    a processor configured by execution of one or more programs of instructions, to determine a communication pathway constructing a network compatible with the first wireless communication standard, based on the device specific information of each one of the plurality of second wireless communication devices; and
    a transmitter to transmit routing information that indicates the communication pathway for the control wireless communication device to each one of the plurality of second wireless communication devices using at least one of the multiple wireless communication standards, wherein
    each of the plurality of second wireless communication devices is configured to establish the wireless communication using the first wireless communication standard based on the routing information that each of the plurality of second wireless communication devices itself acquires from the first wireless communication device, and
    wherein the device specific information includes position data and antenna data to be used for the wireless communication using the first wireless communication standard.

2. The wireless communication system according to claim 1, wherein the processor of the first wireless communication device determines the communication pathway that constructs the network using the first wireless communication standard to minimize interference between the communication pathways of the plurality of second wireless communication devices.

3. The wireless communication system according to claim 1, wherein the routing information includes identification information for identifying a counterpart wireless communication device that communicates with the second wireless communication device using the first wireless communication standard.

4. The wireless communication system according to claim 3, wherein the routing information includes reservation time information used for data transfer between the second wireless communication device that receives the routing information and the counterpart wireless communication device using the first wireless communication standard.

5. The wireless communication system according to claim 1, wherein the transmitter of the first wireless communication device transfers the routing information using any one of the multiple wireless communication standards that uses the lower frequency band than that of the first wireless communication.

6. The wireless communication system according to claim 1, wherein each of the second wireless communication devices performs the wireless communication using the first wireless communication standard with the counterpart wireless communication device indicated in the routing information using a beam-forming function.

7. The wireless communication system according to claim 6, wherein each of the second wireless communication devices searches for the counterpart wireless communication device configuring its antenna as a semi-directional antenna or non-directional antenna and subsequently reconfigures its antenna as a directional antenna using the beam-forming function.

8. The wireless communication system according to claim 4, wherein
each of the second wireless communication device itself becomes a PBSS central point (PCP) in the wireless communication with the counterpart wireless communication device when the counterpart wireless communication device is indicated as the destination in the routing information,
the counterpart wireless communication device indicated as the source in the routing information becomes the PCP in the wireless communication with each of the second wireless communication device, and
the PCP adjusts a service period (SP) of the wireless communication based on the reservation time information indicated in the routing information.

9. The wireless communication system according to claim 1, wherein each of the second wireless communication devices can perform the wireless communication with the counterpart wireless communication device using the first wireless communication standard without using the beam-forming function.

10. The wireless communication system according to claim 1, wherein each of the second wireless communication devices reports to the first wireless communication device about the device specific information either in response to a request by the first wireless communication device or automatically, and either regularly or irregularly.

11. The wireless communication system according to claim 1, wherein the first wireless communication device requests each second wireless communication device in the network using the first wireless communication standard to transfer a list of currently communicable counterparts using the first wireless communication standard, and the processor determines the communication pathway that constructs the network using the first wireless communication standard based on the list of the currently communicable counterparts transferred by each second wireless communication device in the network using the first wireless communication standard.

12. The wireless communication system according to claim 1, wherein the first wireless communication standard is an extremely high frequency (EHF) wireless communication standard, and the one or more wireless communication standards using the frequency band lower than that of the first wireless communication standard are wireless communication standards using 2.4 GHz frequency band and/or 5 GHz frequency band.

13. A wireless communication device that centrally controls a plurality of wireless communication devices and compatible with multiple wireless communication standards, the wireless communication device comprising:
a receiver to receive device specific information from one of the plurality of wireless communication devices using at least one of the multiple wireless communication standards, the multiple wireless communication standards including a first wireless communication standard and one or more wireless communication standards using a frequency band lower than that of the first wireless communication standard;
a processor configured by execution of one or more programs of instructions, to determine a communication pathway constructing a network compatible with the first wireless communication standard, based on the device specific information of the one of the plurality of wireless communication devices; and
a transmitter to transmit routing information that indicates the communication pathway for the wireless communication device to the one of the plurality of wireless communication devices using at least one of the multiple wireless communication standards,
wherein the device specific information includes position data and antenna data to be used for the wireless communication using the first wireless communication standard.

14. A non-transitory, computer-readable recording medium storing a program that, when executed by a processor, causes the processor to implement a wireless communication method using a wireless communication device that centrally controls a plurality of wireless communication devices and compatible with multiple wireless communication standards, the method comprising:
receiving device specific information from one of the plurality of wireless communication devices using at least one of the multiple wireless communication standards, the multiple wireless communication standards including a first wireless communication standard and one or more wireless communication standards using a frequency band lower than that of the first wireless communication standard;
determining a communication pathway constructing a network compatible with the first wireless communication standard, based on the device specific information of the one of the plurality of wireless communication devices; and
transmitting routing information that indicates the communication pathway for the wireless communication device to the one of the plurality of wireless communication devices using at least one of the multiple wireless communication standards,
wherein the device specific information includes position data and antenna data to be used for the wireless communication using the first wireless communication standard.

* * * * *